Aug. 5, 1924.
E. R. BURTNETT
1,504,096
INTERNAL COMBUSTION ENGINE
Filed Feb. 23, 1922    3 Sheets-Sheet 2
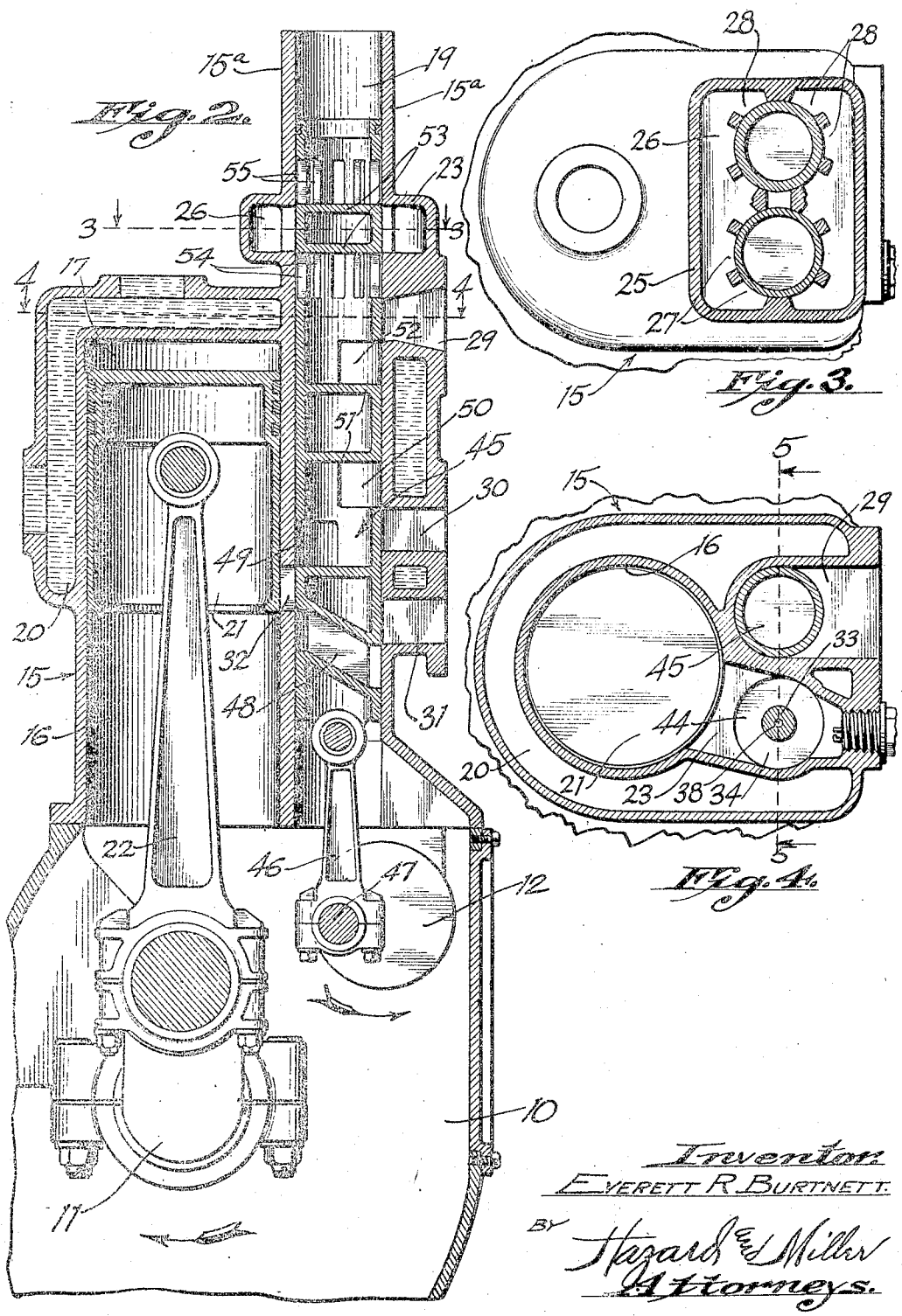

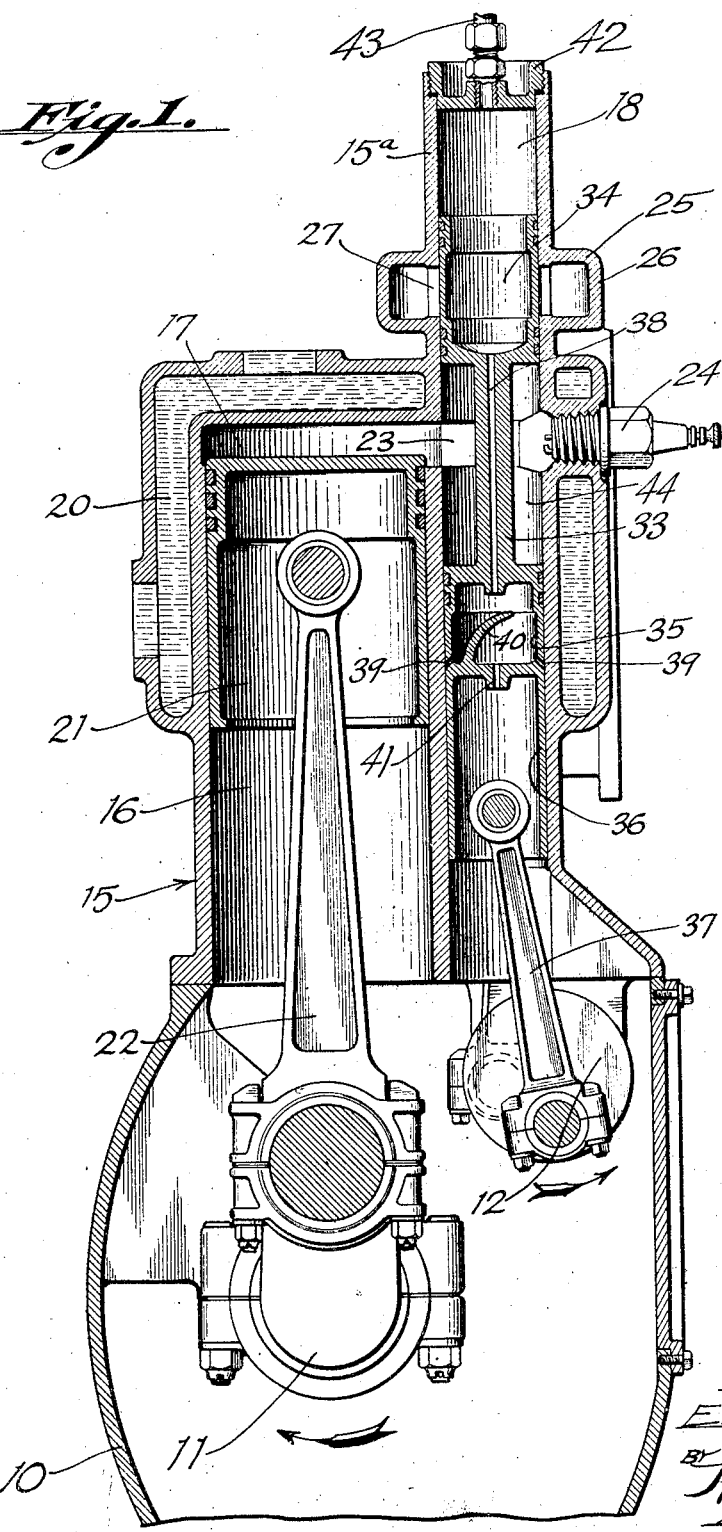

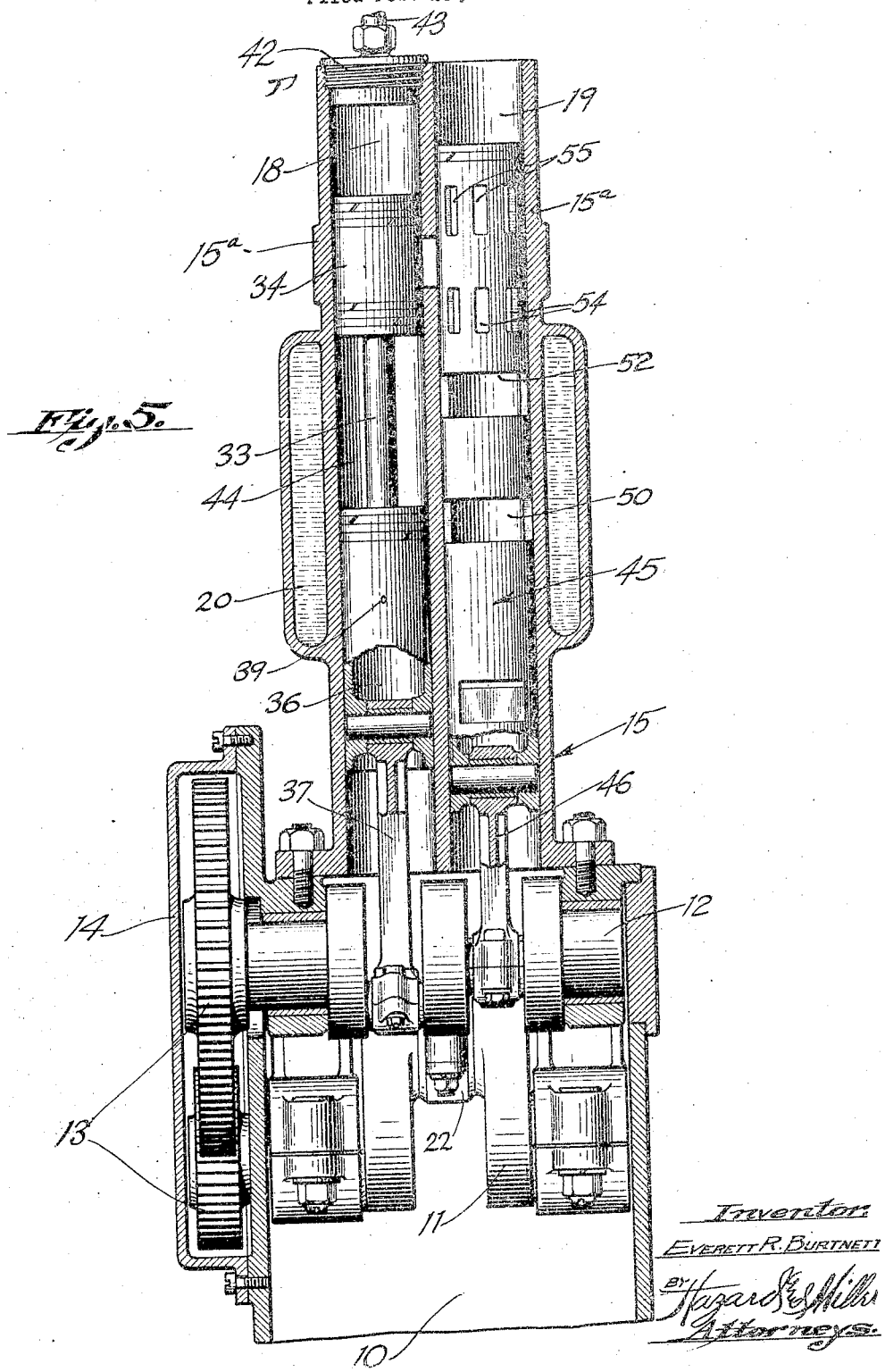

Patented Aug. 5, 1924.

1,504,096

UNITED STATES PATENT OFFICE.

EVERETT R. BURTNETT, OF LOS ANGELES, CALIFORNIA, ASSIGNOR OF ONE-HALF TO HOMER A. BRUNELL, OF LOS ANGELES, CALIFORNIA.

INTERNAL-COMBUSTION ENGINE.

Application filed February 23, 1922. Serial No. 538,754.

*To all whom it may concern:*

Be it known that I, EVERETT R. BURTNETT, a citizen of the United States, residing at Los Angeles, in the county of Los Angeles and State of California, have invented new and useful Improvements in Internal-Combustion Engines, of which the following is a specification.

My invention relates to internal combustion engines, and has for its principal object the provision of a relatively simple and efficient engine having a piston valve and a ported reciprocating member that are arranged for operation in separate chambers immediately adjacent to the main piston or power chamber of the engine and which reciprocating piston and ported member cooperate in controlling the admission of gaseous fuel into the combustion chamber of the engine and likewise controlling the discharge of burnt gases and products of combustion from said combustion chamber.

Further objects of my invention are to generally improve upon and simplify the construction of the existing forms of similar types of engines, to provide a construction wherein the working cylinder is provided with a main port that performs the functions of an inlet port and an exhaust port and said engine having a secondary or auxiliary port that constitutes a combined inlet and exhaust port; such construction providing dual inlet and exhaust openings, thereby insuring the admission of fuel charges to the combustion chamber of the engine and likewise insuring the complete exhaust of all products of combustion from said combustion chamber, to provide, in an internal combustion engine, a cylinder block that is capable of being easily and cheaply produced and finished, to provide for the rapid and effective radiation of heat developed within the engine during operation, so as to remove the cause of warping and blistering of the piston head and the walls of the cylinder adjacent to the exhaust port, and, further, to provide an engine that has relatively few moving parts, thereby minimizing noise in operation, and to provide an engine having great flexibility and a maximum efficiency at high speeds, and which latter result is attained by providing ample openings for the gaseous fuel entering the combustion chamber and the products of combustion discharging therefrom.

With the foregoing and other objects in view, my invention consists in certain novel features of construction and arrangement of parts that will be hereinafter more fully described and claimed and illustrated in the accompanying drawings, in which:

Fig. 1 is a vertical section taken through the center of the combustion chamber of an engine of my improved construction and through the piston valve and piston valve chamber.

Fig. 2 is a vertical section taken through the center of the combustion chamber of the engine and through the center of the reciprocating selector and selector chamber.

Fig. 3 is a horizontal section taken approximately on the line 3—3 of Fig. 2.

Fig. 4 is a horizontal section taken approximately on the line 4—4 of Fig. 2.

Fig. 5 is a transverse section taken vertically through the piston valve and selector chambers, and said view being taken approximately on the line 5—5 of Fig. 4.

Referring by numerals to the accompanying drawings, which illustrate a practical embodiment of my invention, 10 designates a crank case of suitable structure and provided with bearings for a main crank shaft 11 and a valve and selector-actuating crank shaft 12, the latter being driven at half the speed of the crank shaft by a suitable gearing 13 that connects said crank shafts, and said gearing being enclosed in a suitable housing 14.

Surmounting the crank case 10 is a cylinder block 15 in which is formed a piston chamber 16, the upper portion 17 thereof constituting the combustion chamber, and formed in the block, to one side of and parallel with said piston chamber 16 is a piston valve chamber 18 and a reciprocating selector chamber 19.

The chambers 18 and 19 are necessarily longer than the piston chamber 16, and the upper portions of said longer chambers are enclosed by suitable walls 15ª, which latter are continuations of block 15.

The wall of the block surrounding the combustion chamber 17 and surrounding the intermediate portions of the chambers 18 and 19, are provided with connected chambers 20 through which a fluid cooling medium such as water is adapted to circulate in order to disseminate the heat developed in the combustion chamber of the engine during operation.

While I have shown my improved engine as having but a single cylinder, it will be understood that the construction as illustrated and described may be incorporated in a multi-cylinder engine, in which event the cylinders are, preferably, cast en bloc.

Arranged for reciprocatory movement within the piston chamber 16, is a piston 21 of suitable structure, and, connecting the same to the crank on shaft 11, is an ordinary connecting rod 22.

The upper end of the combustion chamber 17 has communication with the intermediate portion of chamber 18 through a port 23, and seated in the wall surrounding said chamber 18 and preferably at a point directly opposite this port 23, is a spark plug 24, the operation of which is controlled by a suitable timing apparatus (not shown).

Formed integral with or fixed to the cylindrical walls 15$^a$ that inclose the upper portions of the chambers 18 and 19, is a housing 25, the chamber 26 within which has communication with the piston valve chamber 18 through a series of ports or openings 27 and with the selector chamber 19 through a series of ports or openings 28.

Formed through the wall of the cylinder block, immediately below the chamber 26 and leading outwardly from the selector chamber 19, is an inlet port 29, and formed through said wall at points a short distance below this inlet port 29, is an auxiliary outlet port 30.

Formed through the wall of the cylinder block, a short distance below this auxiliary exhaust port 30, is an auxiliary inlet port 31, and formed in the wall between the selector chamber 19 and the intermediate portion of the piston chamber 16, is a combined auxiliary inlet and exhaust port 32, the same occupying a horizontal plane between the ports 30 and 31.

Arranged for reciprocatory movement within chamber 18 is a piston valve that comprises a cylindrical stem portion 33, an upper cup-shaped head 34, a lower hollow cylindrical head 35, and a skirt portion 36 that depends from said lower head. The lower portion of this cylindrical valve is connected, by a suitable rod 37, to one of the cranks of shaft 12.

Formed through the stem 33 of this piston valve is an axially disposed bore or passageway 38 that establishes communication between the chambers within cup-shaped head 34 and the hollow cylindrical head 35 and consequently permitting oil to flow freely from the upper to the lower chamber.

Formed through the annular wall of the cylindrical head 35, immediately above the bottom thereof, are downwardly and outwardly inclined oil ducts 39 which provide means for delivering liquid lubricant onto the surface of the lower portion of reciprocating piston chamber 18, and, to insure delivery of oil to these ducts 39, an inclined or curved deflector plate 40 is arranged within the chamber in lower head 35, directly beneath the lower or discharge end of duct or passageway 38.

Formed through the bottom of the lower head 35 is an axially disposed duct 41 that provides means for permitting liquid lubricant to discharge directly onto the wristpin to which the upper end of rod 37 is connected.

The upper end of chamber 18 is closed by a suitable plug or cap 42 and leading thereto, from a source of supply, is a liquid lubricant pipe or conduit 43.

The annular chamber 44, between the heads 34 and 35, and surrounding the stem 33, is always in communication with the main inlet port 23 and the combustion chamber 17, and, during the reciprocation of the piston valve, the upper head 35 controls the ports 27 that provide communication between chamber 26 and the upper portion of piston chamber 18.

Arranged for reciprocatory movement within the chamber 19 is a substantially hollow cylindrical member 45 that performs the functions of a selector and which cooperates with the reciprocating piston in controlling the ingress of gaseous fuel into the combustion chamber of the engine and the subsequent egress of the burnt gases and products of combustion therefrom, and the lower portion of said selector is connected, by a rod 46, to a crank 47 on crank shaft 12 and which crank is arranged at an angle of approximately 90° with respect to the crank to which connecting rod 37 is connected.

Formed through the lower portion of this cylindrical selector, is an inclined port or passageway 48 that is adapted to establish communication between the ports 31 and 32, and formed through the wall of the selector above this port 48, are oppositely arranged ports 49 and 50 that occupy different horizontal planes and which are adapted to coincide respectively, with the ports 32 and 30.

Arranged within selector 45, above port 50, are horizontally disposed partitions 51 and formed through the wall of said selector, immediately above the upper one of said partitions, is a port 52 that is adapted to register with port 29 at a certain period in the reciprocation of said selector.

Formed in the upper portion of the selector are horizontally disposed partions 53 and formed through the wall of said selector, immediately below the lowermost of these partitions, is a series of ports 54 that are adapted to coincide with the ports 28.

Formed through the wall of the selector, immediately above the upper one of the partitions 53, is a series of ports 55 that are adapted to coincide with ports 28 when the selector is drawn downwardly to its limit of movement.

The distance between the ports 54 and 55 is approximately equal to, or slightly greater than, the height of the ports 28; consequently, when the selector occupies an intermediate position, as illustrated in Fig. 2, the passage of burnt gases or products of combustion through the ports 28 is cut off.

The crank shafts 11 and 12 are set or positioned with respect to each other, so that when piston 21 is at the upper end of its compression stroke and the charge of gaseous fuel drawn into the combustion chamber is under highest compression, the piston valve and the selector occupy the positions as illustrated in Figs. 1, 2 and 5, and when so positioned the selector is moving downward on the latter half of its downward stroke and the piston valve is beginning its upward stroke.

The charge of gaseous fuel drawn into the combustion chamber on the previous suction stroke of the piston, is compressed in the combustion chamber 17 and annular chamber 44 about the stem of the piston valve, and said charge is ignited as a result of a spark produced between the terminals of the spark plug 24 by the timing apparatus associated with the engine, and as the gaseous charge is thus ignited, its force is expended to move the piston 21 downward on its power stroke.

As the piston 21 starts to move downward on its power stroke, selector 45 is drawn downward, by its crank and connecting rod, at half the speed of movement of said piston, and such downward movement of the selector gradually brings ports 49 and 50 into full registration with ports 32 and 30 respectively, so that when piston 21 has reached its lower limit of movement on the power stroke, ports 32 and 49 and 50 and 30 are in full registration with each other, and the ports 55 in the upper end of said selector are in full registration with exhaust chamber 26 through ports 28.

Thus, when the upper face of the piston 21 passes the upper edge of port 32, and during the movement of the upper face of said piston downward to the lower edge of said port, a considerable portion of the products of combustion above said piston are permitted to discharge through coinciding ports 32 and 49 and ports 50 and 30, thereby effecting a material reduction or drop of pressure within the combustion chamber, and on the succeeding upward or exhaust stroke of piston 21, the remaining products of combustion will be forced out, through port 23, into the annular chamber 44 in the piston valve, and from thence the chamber 26, with which annular chamber 44 is in communication by reason of the fact that said piston has moved upward, until the lower end of head 34 fully uncovers ports 27, and, from said chamber 26, the products of combustion will exhaust through ports 55 that are in register with ports 28, and said products of combustion will finally discharge through the upper portion of the selector chamber 19.

During the upward movement of the piston 21 on its exhaust stroke, the selector is being moved upwardly through the first half of its upward movement, thereby gradually moving exhaust ports 55 out of registration with ports 28, so that when piston 21 reaches its upper limit of movement, or high center, the exhaust ports just mentioned will be fully closed.

When piston 21 reaches its high center at the end of its exhaust stroke, the upper edge of port 52 is brought into registration with the lower edge of main inlet port 29, and as the selector continues to move upwardly simultaneously with the downward or suction movement of piston 21, the inlet opening for gaseous fuel drawn into the engine through ports 29 and 52 gradually increases in size proportionate with the downward movement of piston 21, and the charge of gaseous fuel thus drawn into the chamber within the selector with which port 52 communicates, will be drawn, through registering ports 54 and 28, into chamber 26, from thence, through ports 27, into annular chamber 44 of the piston valve, which latter was elevated during the power and exhaust strokes of the piston 21 and which, during the suction stroke of said piston, is moving downward at half speed, thereby gradually cutting off communication between annular chamber 44 and ports 27, and said gaseous fuel, after being drawn into annular chamber 44, will pass through port 23 into the combustion chamber 17.

At the end of the suction stroke, piston 21 will be at its lower center or lower limit of movement, the selector will be at its highest limit of movement, and the piston valve will be at the half-way point on its downward travel; and, with said selector and piston valve in these positions, port 48 will be in full registration with auxiliary inlet ports 31 and 32, thereby admitting additional gaseous fuel to the combustion chamber of the engine during the final portion of the downward travel of piston 21 and consequently insuring the filling of the combustion chamber with a maximum combustible charge.

As piston 21 moves upward on its succeeding or compression stroke, the charge of gaseous fuel previously drawn into the combustion chamber will be compressed therein and in the annular chamber 44, which is always in communication with the combustion chamber 17 through port 23, and, when piston 21 has completed its compression stroke and is at its high center, the selector 45 and the piston valve will occupy the position as illustrated in Figs. 1 and 2, said piston valve being at its lower limit of movement and the selector at a half-way point in its downward movement.

At the point of highest compression, or immediately thereafter, the timing apparatus associated with the engine produces a spark between the terminals of plug 24, thereby igniting the gaseous fuel within the combustion chamber and consequently forcing the piston 21 downward on its power stroke.

During the operation of the engine, the external surface of the lower portion of the piston valve will be effectively lubricated by oil that discharges downwardly through duct 38 and out through ducts 39, and the wristpin that connects rod 37 to the skirt portion 36 of said valve, will be lubricated by oil that drops onto said wristpin from outlet aperture 41.

The selector and piston valve cooperate to effectually control the admission of fuel gases into the combustion chamber of the engine, and likewise the exhaust of products of combustion from said combustion chamber, and, by providing the main and auxiliary inlet and exhaust ports, gaseous fuel is admitted to both ends of the combustion chamber, thereby insuring the complete filling of said chamber with combustible charges and also insuring the complete elimination or discharge of all burnt gases and products of combustion during the exhaust stroke of the piston 21.

The piston valve and selector are arranged side by side in chambers that are of uniform diameter throughout their lengths, thereby providing a relatively simple and compact arrangement, and at the same time providing a structure that may be easily and cheaply produced and enabling the valve and selector to be readily assembled, or removed in the event that the parts require repairs or adjustments.

The provision of an auxiliary exhaust outlet at the lower end of the combustion chamber provides for an instant drop in pressure within said chamber at the end of the power stroke, and the arrangement whereby both main and auxiliary inlet ports are fully open at the beginning of the inlet suction stroke of the piston insures the complete filling of the combustion chamber with gaseous fuel, even at high speeds, and consequently effecting a material increase in efficiency of the engine.

The inlet of gaseous fuel through the auxiliary inlet ports provides for a cooling effect on the piston and the cylinder walls immediately adjacent to the auxiliary inlet ports, thereby materially reducing the temperature in said walls and piston head and eliminating the blistering and warping of said head and walls.

All of the moving parts of the engine that are subjected to the highest degrees of heat resulting from the continued explosions within the combustion chamber, are arranged so that they reciprocate or travel over water-cooled surfaces, and as a result, the heat is constantly disseminated thereby preventing warping and blistering of said parts.

The arrangement of selector and valve in my improved engine gives great flexibility and maximum efficiency at high speed without the necessity for the usual lead and lag timing, which is a detriment even on slow speed engines.

It will be readily understood that minor changes in the size, form and construction of the various parts of my improved internal combustion engine may be made and substituted for those herein shown and described without departing from the spirit of my invention, the scope of which is set forth in the appended claims.

I claim as my invention:

1. The combination with an internal combustion engine having a primary inlet and exhaust port and a secondary inlet and exhaust port, of a piston valve and selector arranged for operation adjacent to each other and adapted to cooperate in controlling the admission of gaseous fuel through said ports into the combustion chamber of the engine and the discharge of burnt gases and products of combustion from said combustion chamber.

2. The combination with an internal combustion engine having a primary inlet and exhaust port and a secondary inlet and exhaust port, of a piston valve and selector arranged for operation adjacent to each other and adapted to cooperate in controlling the admission of gaseous fuel through said ports into the combustion chamber of the engine and the discharge of burnt gases and products of combustion from said combustion chamber, and means for actuating said piston valve and selector in proper time relation to the movements of the piston of the engine.

3. The combination with an internal combustion engine having a primary inlet and exhaust port and a secondary inlet and exhaust port, of a piston valve and selector arranged for operation adjacent to each other and adapted to cooperate in controlling the admission of gaseous fuel through said ports into the combustion chamber of the engine and the discharge of burnt gases and products of combustion from said combustion chamber, and means for actuating said piston valve and selector in proper time relation to each other and to the movements of the piston of the engine.

4. An internal combustion engine having a combined inlet and exhaust port and a piston valve and selector both arranged for reciprocatory operation adjacent to each other for controlling the admission of gaseous fuel through said port into the combustion chamber and the discharge of burnt gases and products of combustion from said combustion chamber.

5. The combination with an internal combustion engine having combined inlet and exhaust ports arranged adjacent to the ends of the combustion chamber of the engine, reciprocating members adapted to cooperate in controlling the admission of gaseous fuel and burnt products of combustion through one of said ports, and one of which reciprocating members controls the admission of gaseous fuel and the discharge of burnt products of combustion through the other port.

6. The combination with an internal combustion engine having combined inlet and exhaust ports arranged adjacent to the ends of the combustion chamber of the engine, reciprocating members adapted to cooperate in controlling the admission of gaseous fuel and burnt products of combustion through one of said ports, one of which reciprocating members controls the admission of gaseous fuel and the discharge of burnt products of combustion through the other port, and means for actuating said reciprocating members in proper time relation to each other and to the piston of the engine.

7. An internal combustion engine having a combustion chamber, a piston operating therein, combined inlet and exhaust ports arranged adjacent to the ends of said combustion chamber, and means including a piston valve and a selector for admitting gaseous fuel through said ports at both ends of the suction stroke of the piston and for permitting the discharge of burnt products of combustion from said combustion chamber at both ends of the exhaust stroke of the piston.

8. An internal combustion engine having a combustion chamber and a piston operating therein, means for admitting gaseous fuel to said combustion chamber at the beginning and end of the suction stroke of the piston and means for permitting a discharge of a portion of the burnt products of combustion and effecting a material lowering of pressure within the combustion chamber at the end of the power stroke of the piston.

9. In an internal combustion engine, a cylinder block provided with a combustion chamber, a piston arranged for operation therein, elongated cylindrical chambers formed in said block adjacent to each other and parallel with the combustion chamber, there being combined inlet and exhaust ports arranged in the cylinder block adjacent to the ends of the combustion chamber therein, a piston valve arranged for operation in one of the elongated chambers and a selector arranged for operation in the other elongated chambers, which piston valve and selector cooperate in controlling the passage of gaseous fuel and burnt products of combustion through said combined inlet and exhaust ports.

10. In an internal combustion engine, a cylinder block provided with a combustion chamber, a piston arranged for operation therein, elongated cylindrical chambers formed in said block adjacent to each other and parallel with the combustion chamber, there being combined inlet and exhaust ports arranged in the cylinder block adjacent to the ends of the combustion chamber therein, a piston valve arranged for operation in one of the elongated chambers, a selector arranged for operation in the other elongated chambers, which piston valve and selector cooperate in controlling the passage of gaseous fuel and burnt products of combustion through said combined inlet and exhaust ports, and means for actuating said piston valve and selector in proper time relation to each other.

11. In an internal combustion engine, a cylinder block provided with a combustion chamber, a piston arranged for operation therein, elongated cylindrical chambers formed in said block adjacent to each other and parallel with the combustion chamber, there being combined inlet and exhaust ports arranged in the cylinder block adjacent to the ends of the combustion chamber therein, a piston valve arranged for operation in one of the elongated chambers, a selector arranged for operation in the other elongated chamber, which piston valve and selector cooperate in controlling the passage of gaseous fuel and burnt products of combustion through said combined inlet and exhaust ports, and means for actuating said piston valve and selector in proper time relation to each other and to the piston of the engine.

12. In an internal combustion engine, a cylinder block provided with a combustion chamber, a piston arranged for operation therein, elongated cylindrical chambers formed in said block adjacent to each other and parallel with the combustion chamber, there being combined inlet and exhaust ports arranged in the cylinder block adjacent to the ends of the combustion chamber therein, a piston valve arranged for operation in one of the elongated chambers, a selector arranged for operation in the other elongated chamber, which piston valve and selector cooperate in controlling the passage of gaseous fuel and burnt products of combustion through said combined inlet and exhaust ports, and there being fluid cooling medium chambers formed in the wall of the cylinder block around said combustion chamber and said elongated chambers.

13. An internal combustion engine having a combustion chamber and a piston arranged for operation therein, there being combined inlet and exhaust ports formed in the wall of the engine cylinder adjacent to the ends of the combustion chamber, a selector for controlling the passage of gaseous fuel and products of combustion through said combined inlet and exhaust ports, and a piston valve cooperating with said selector for controlling the passage of gaseous fuel and burnt products of combustion through one of said ports.

14. An internal combustion engine having a combustion chamber and a piston arranged for operation therein, there being combined inlet and exhaust ports formed in the wall of the engine cylinder adjacent to the ends of the combustion chamber, a selector for controlling the passage of gaseous fuel and products of combustion through said combined inlet and exhaust ports, a piston valve cooperating with said selector for controlling the passage of gaseous fuel and burnt products of combustion through one of said ports, and means for actuating said selector and piston valve in proper time relation to each other and to the piston of the engine.

15. The combination with an internal combustion engine having a combustion chamber and a piston operating therein, of cooperating means for controlling the admission of gaseous fuel to the upper end of the combustion chamber, the discharge of burnt products of combustion from the combustion chamber on the exhaust stroke of the piston, the admission of gaseous fuel to the lower portion of the combustion chamber at the end of the suction stroke of the piston and the discharge of burnt products of combustion from the combustion chamber at the end of the power stroke of the piston.

16. The combination with an internal combustion engine having a combustion chamber and a piston operating therein, of cooperating means for controlling the admission of gaseous fuel to the upper end of the combustion chamber, the discharge of burnt products of combustion from the combustion chamber on the exhaust stroke of the piston, the admission of gaseous fuel to the lower portion of the combustion chamber at the end of the suction stroke of the piston and the discharge of burnt products of combustion from the combustion chamber at the end of the power stroke of the piston, and means for actuating said cooperating means in proper time relation to the movements of the piston of the engine.

17. In an internal combustion engine, a cylinder block provided with a combustion chamber and a pair of elongated chambers arranged side by side and adjacent to said combustion chamber, there being a combined inlet and exhaust port leading from one of said elongated chambers into the upper portion of the combustion chamber, there being a combined inlet and exhaust port leading from the other one of said elongated chambers onto the lower portion of the combustion chamber, and cooperating members arranged for reciprocating movement within said elongated chambers for controlling the passage of gaseous fuel and burnt products of combustion through said combined inlet and exhaust ports.

18. In an internal combustion engine, a cylinder block provided with a combustion chamber and a pair of elongated chambers arranged side by side and adjacent to said combustion chamber, there being a combined inlet and exhaust port leading from one of said elongated chambers into the upper portion of the combustion chamber, there being a combined inlet and exhaust port leading from the other one of said elongated chambers into the lower portion of the combustion chamber, cooperating members arranged for reciprocating movement within said elongated chambers for controlling the passage of gaseous fuel and burnt products of combustion through said combined inlet and exhaust ports, and means for actuating said cooperating members in proper time relation to each other and to the movements of the piston of the engine.

In testimony whereof I have signed my name to this specification.

EVERETT R. BURTNETT.